United States Patent
Hsieh (10) Patent No.: US 7,233,231 B2
(45) Date of Patent: Jun. 19, 2007

(54) VEHICLE STEERING WHEEL LOCK WITH A BURGLAR-PROOF ALARM DEVICE

(76) Inventor: Chen-Kuei Hsieh, 235 Chung-Ho Box 8-24, Taipei (TW)

( * ) Notice: Subject to any disclaimer, the term of this patent is extended or adjusted under 35 U.S.C. 154(b) by 193 days.

(21) Appl. No.: 11/140,154

(22) Filed: May 31, 2005

(65) Prior Publication Data

US 2006/0267742 A1  Nov. 30, 2006

(51) Int. Cl.
*B60R 25/10* (2006.01)
(52) U.S. Cl. .............................. 340/426.1; 340/426.25; 340/426.26; 340/426.31; 340/611; 340/626; 70/14; 70/39; 73/118.2; 200/61.54
(58) Field of Classification Search ............. 340/426.1, 340/426.25, 426.26, 426.31, 611, 626; 70/14, 70/39, 209; 200/61.54; 73/118.1, 118.2
See application file for complete search history.

(56) References Cited

U.S. PATENT DOCUMENTS 6,351,989 B1 * 3/2002 Foss ........................... 73/118.1
6,433,678 B1 * 8/2002 Hsieh ..................... 340/426.31
7,095,332 B2 * 8/2006 Shimamto et al. ........ 340/686.1
2004/0135683 A1 * 7/2004 Sakai ......................... 340/522

* cited by examiner

*Primary Examiner*—Davetta W. Goins (57) ABSTRACT

A vehicle steering wheel lock with a burglar-proof alarm device comprises a burglar-proof alarm circuit, A wireless signal detecting unit, an air pressure detecting unit; supersonic detecting unit for detecting movements of objects; an infrared receiver for receiving infrared signals from the portable alarm device. The wireless wave emitting unit includes a receiving antennal circuit, a high frequency amplifier, a band pass filter, a local oscillating circuit, a mixing circuit, a middle frequency circuit, and a second middle frequency IC; the receiving antenna circuit being for adjusting the harmonic receiving frequency for receiving high frequency signal, which is then passed through the high frequency amplifier, band pass filter, local oscillating circuit, and the mixing circuit; the local oscillator circuit having a baseband oscillating circuit, a nine-time amplifier circuit, a nine-time frequency modulating circuit for generating an oscillating frequency signal to the mixing circuit.

4 Claims, 7 Drawing Sheets

VEHICLE STEERING WHEEL LOCK WITH A BURGLAR-PROOF ALARM DEVICE

FIELD OF THE INVENTION

The present invention relates vehicle locks, and in particular to a vehicle steering wheel lock with a burglar-proof alarm device, wherein the a lock is installed with a precise burglar-proof alarm circuit with a portable alarm device which can alert an accident wirelessly.

BACKGROUND OF THE INVENTION

The prior art vehicle mechanic locks only have the function of delaying the time period for the thief to stealing the car. They cannot completely prevent the car from being stolen. Thereby electronic locks are developed. They use the batteries of the cars as power supplies. When abnormal conditions occur, such as collision, destroy of the lock, etc., the detectors of the electronic locks will trigger the burglar-proof alarm circuits of cars so as to generate great sounds. However since such kinds of locks use the batteries of the cars, the installation of the circuits are complicated and the circuits are easily found so as to be cut to lose of functions. Furthermore, the mechanic locks and electronic locks are independent means. The uses must pay twice fees to have the two kinds of locks. Furthermore, the electronic locks easily act by mistakes, such as a careless collision. Thereby the owners will lose their attentions when they use the locks for a long time. Furthermore, the prior art burglar-proof alarm circuits are not wireless devices. Except that the owners are nearby the car, otherwise they cannot find the accidents about their cars. Thus, the prior art locks are not effectively.

SUMMARY OF THE INVENTION

Accordingly, the primary object of the present invention is to provide a vehicle steering wheel lock with a burglar-proof alarm device, wherein the a lock is installed with a precise burglar-proof alarm circuit with a portable alarm device which can alert an accident wirelessly.

To achieve above object, the present invention provides a A vehicle steering wheel lock with a burglar-proof alarm device comprises a burglar-proof alarm circuit, A wireless signal detecting unit, an air pressure detecting unit; supersonic detecting unit for detecting movements of objects; an infrared receiver for receiving infrared signals from the portable alarm device. The wireless wave emitting unit includes a receiving antennal circuit, a high frequency amplifier, a band pass filter, a local oscillating circuit, a mixing circuit, a middle frequency circuit, and a second middle frequency IC; the receiving antenna circuit being for adjusting the harmonic receiving frequency for receiving high frequency signal, which is then passed through the high frequency amplifier, band pass filter, local oscillating circuit, and the mixing circuit; the local oscillator circuit having a baseband oscillating circuit, a nine-time amplifier circuit, a nine-time frequency modulating circuit for generating an oscillating frequency signal to the mixing circuit.

The various objects and advantages of the present invention will be more readily understood from the following detailed description when read in conjunction with the appended drawings.

BRIEF DESCRIPTION OF THE PREFERRED EMBODIMENTS

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
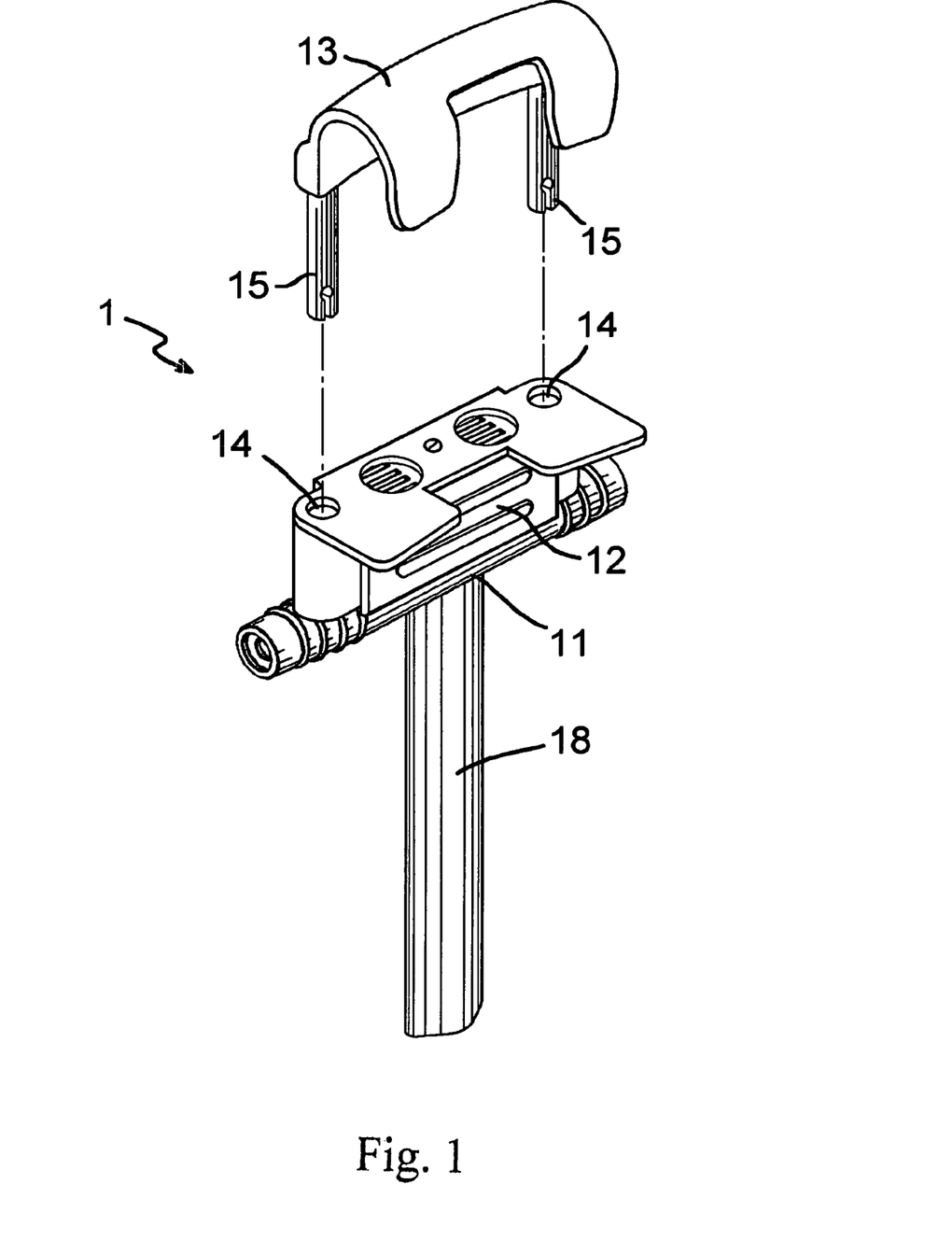
FIG. 1 is a perspective view of the present invention.
Figure 2:
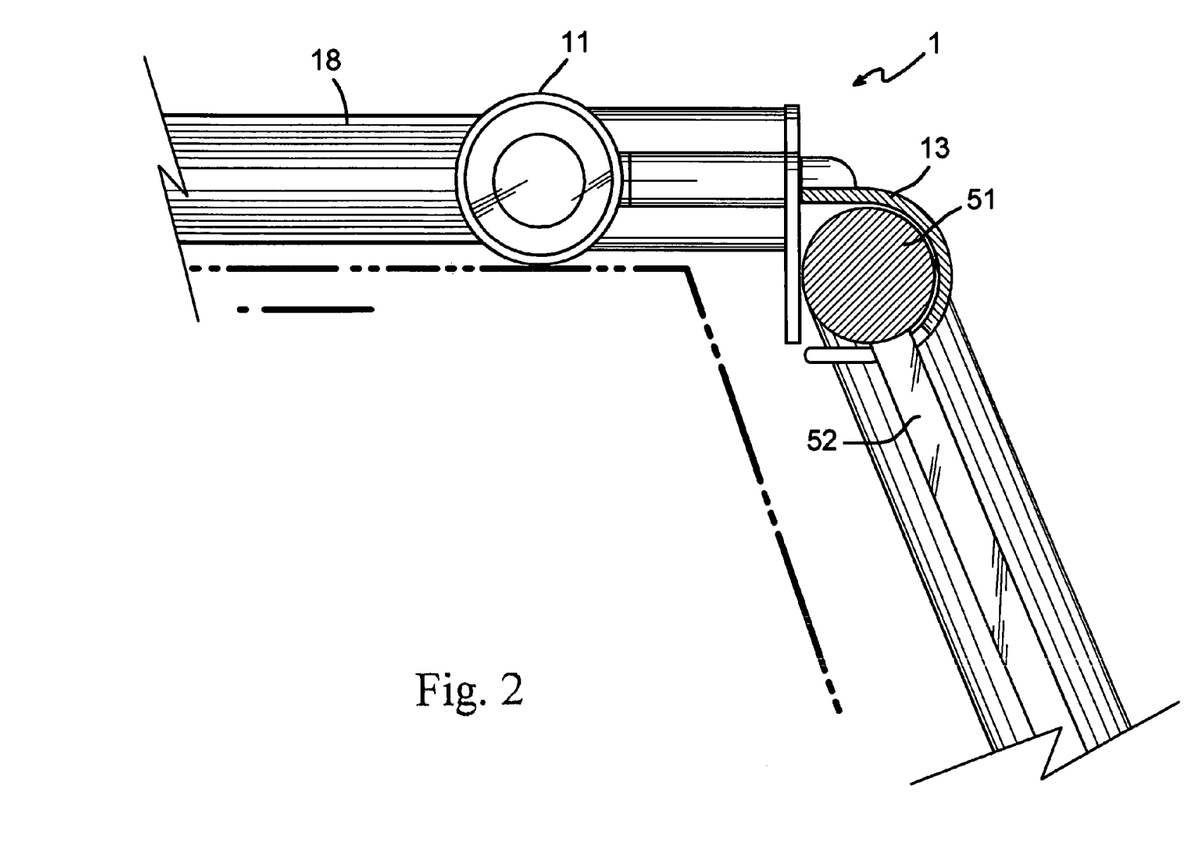
FIG. 2 is a partial cross sectional view showing that the lock of the present invention is locked to a steering wheel of a vehicle.

Referring to FIGS. 1 and 2, the present invention includes a mechanic lock, a burglar-proof alarm circuit, and a portable alarm.

A lock 1 can be locked to a steering wheel. The lock has a locking seat 12 capable of being locked to the burglar-proof alarm circuit, a top of the lock unit 13 for locking the steering wheel and having a C shape cross section; each of two sides of the locking seat 12 has an insertion hole 14 for receiving a stud 15; a lower side of the lock 11 is extended with a long rod 18. In locking the lock unit 13 encloses a ring 15 of the steering wheel so that the C shape area of the lock unit 13 encloses the frame 52 of the steering wheel. Two ends of the stud 15 are inserted into the insertion holes 14 and the long rod 18 is placed upon the panel so as to confine the movement of the steering wheel.

Figure 3:
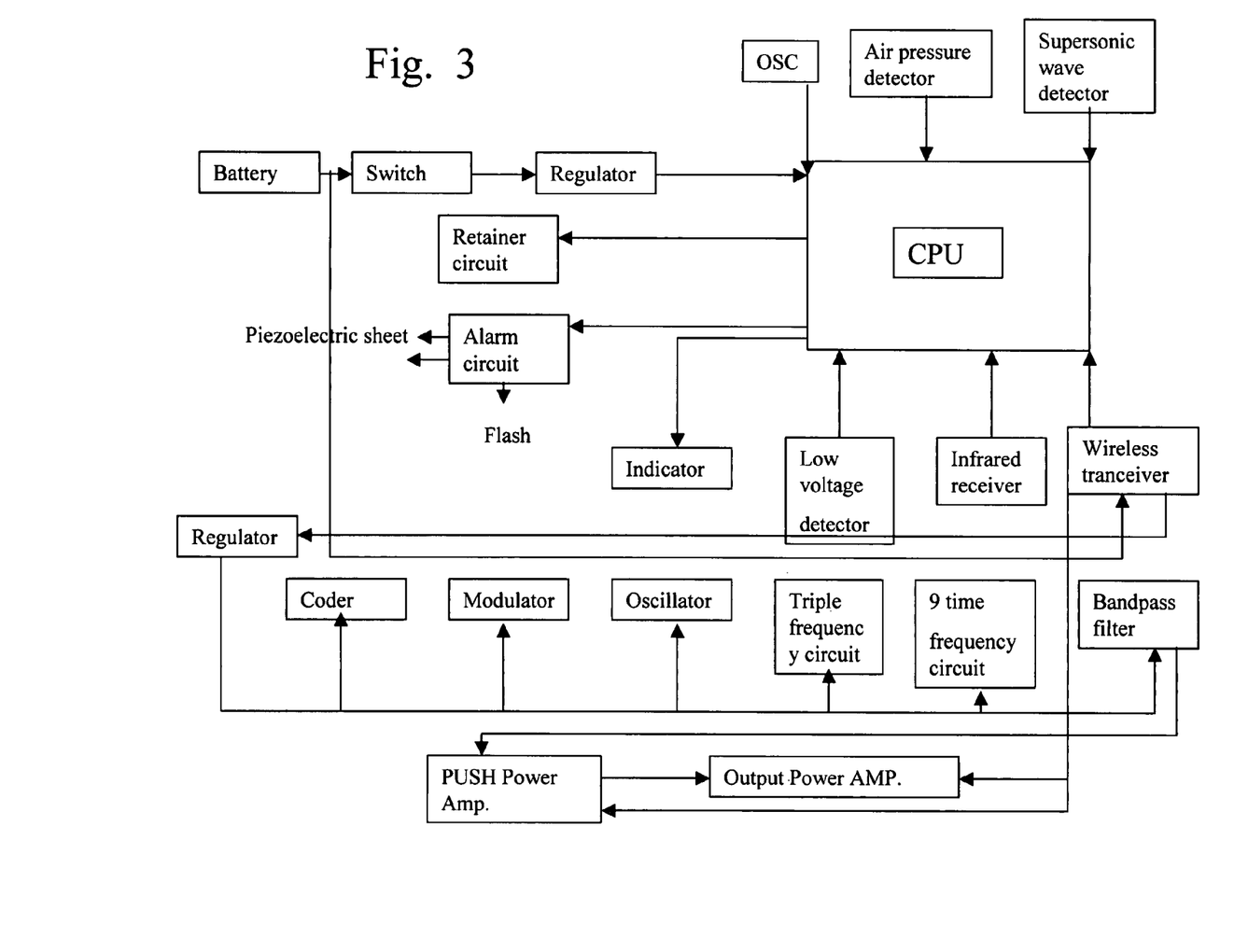
FIG. 3 is a functional block diagram of the present invention.

Referring to FIG. 3, a burglar-proof alarm circuit serves to emit a great sound or a strong sparkle as an abnormal signal is triggered and a wireless signal is emitted to the user. steering wheel. Two ends of the stud 15 are inserted into the insertion holes 14 and the long rod 18 is placed upon the panel so as to confine the movement of the steering wheel.

Referring to FIG. 3, a burglar-proof alarm circuit serves to emit a great sound or a strong sparkle as an abnormal signal is triggered and a wireless signal is emitted to the user.

The burglar-proof alarm circuit has a battery set as a power supply, the power passes through a switch circuit, a retaining circuit and a regulating circuit to the central processing unit (CPU) which is a programmable operation processor. An oscillating circuit is in the CPU. A sound emitting circuit serves to emit sound as receiving alarms from the CPU. A low pressure detecting circuit includes a lower voltage IC (for example, N TAP CMOS IC) for informing PCU when voltage is low. An indicator is flashed in the opening state under the control of the CPU for showing that the burglar-proof alarm circuit is normally operated. The burglar-proof alarm circuit further has an air pressure detecting unit, a supersonic receiving unit and a wireless signal emitting unit.

See FIG. 3, the wireless signal detecting unit has a regulator circuit, a coding circuit, a modulation circuit, a baseband oscillating circuit, a triple frequency circuit, a nine time frequency circuit, a pass band filter, a first stage power supply, and an output power amplifier. The regulating circuit serves to stable the input voltage; the coding circuit serves to generate coding signals; the modulating circuit serves to modulate the frequency of the signals. Signals are processed by the triple frequency circuit, and the nine time frequency circuit and then are transferred to a pass band filter and then to the first stage power supply, and an output power amplifier for amplifying the signals to be emitted out.

Figure 4:
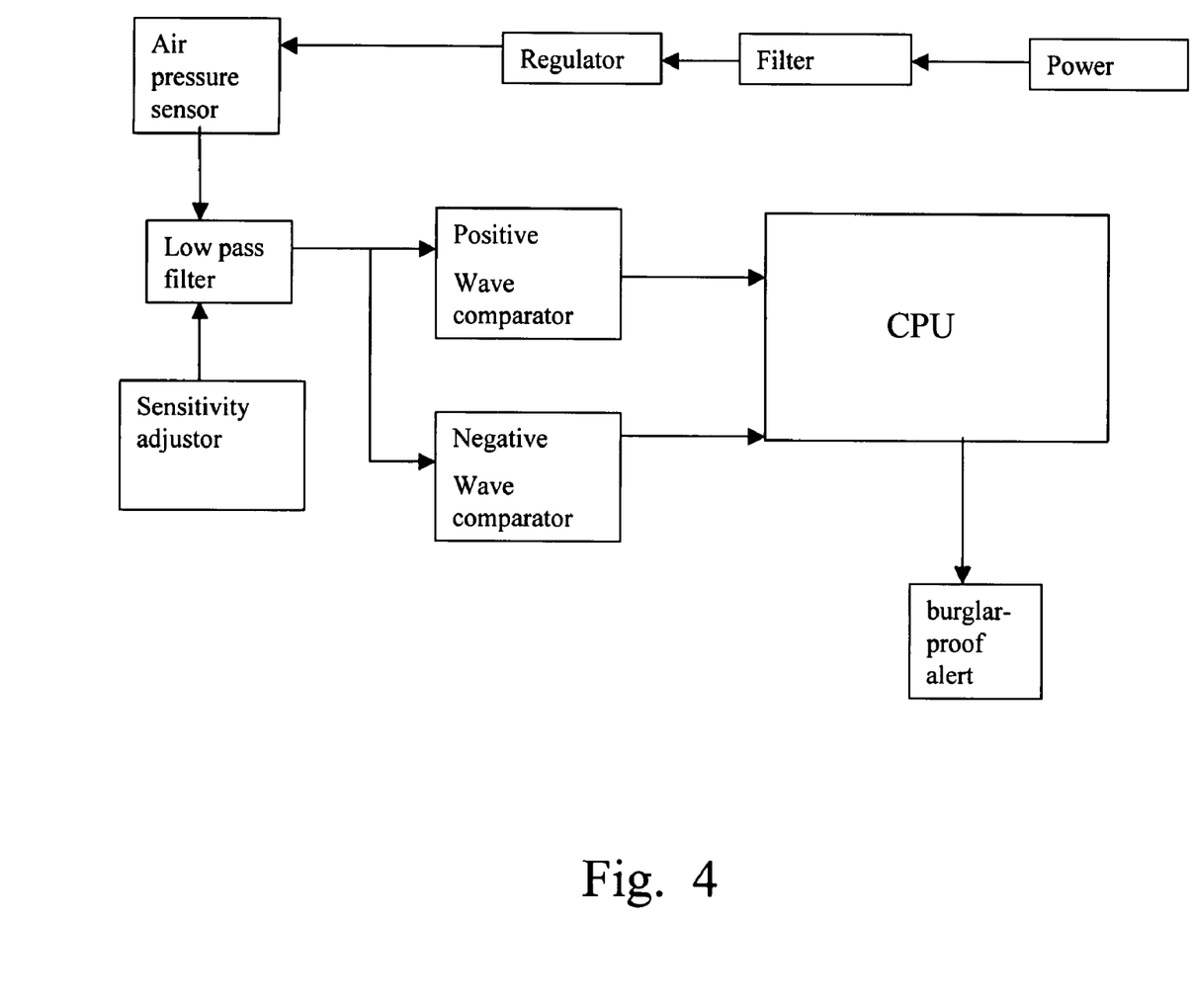
FIG. 4 is a functional block diagram of the air pressure detecting unit of the present invention.

The air pressure detecting unit serves to detect the air pressure within a car so as to detect whether the door of a car is opened by using a positive pressure and negative pressure. When negative pressure disappears, the alarm is actuated. When positive pressure disappear, while the negative pressure exist, no data is read within 200 ms so as to reduce the airflow affect with a car body to have a higher accuracy.

With reference to FIG. 4, the air pressure detecting unit includes a power filter, a regulating circuit, an air pressure sensor, a low pass amplifier, a positive and a negative wave comparator, and a sensitivity adjusting circuit. Signals passes through the air pressure detecting unit includes a power filter, a regulating circuit, an air pressure sensor, a low pass amplifier, and then enters into the positive wave comparator, and the negative comparator circuit so as to determine the variation of the air pressure within the car. Then the variation is changed as electronic signals in the CPU. The CPU performs preset burglar-proof alarm actions. The sensitivity adjusting circuit is formed by mainly a variator.

Figure 5:
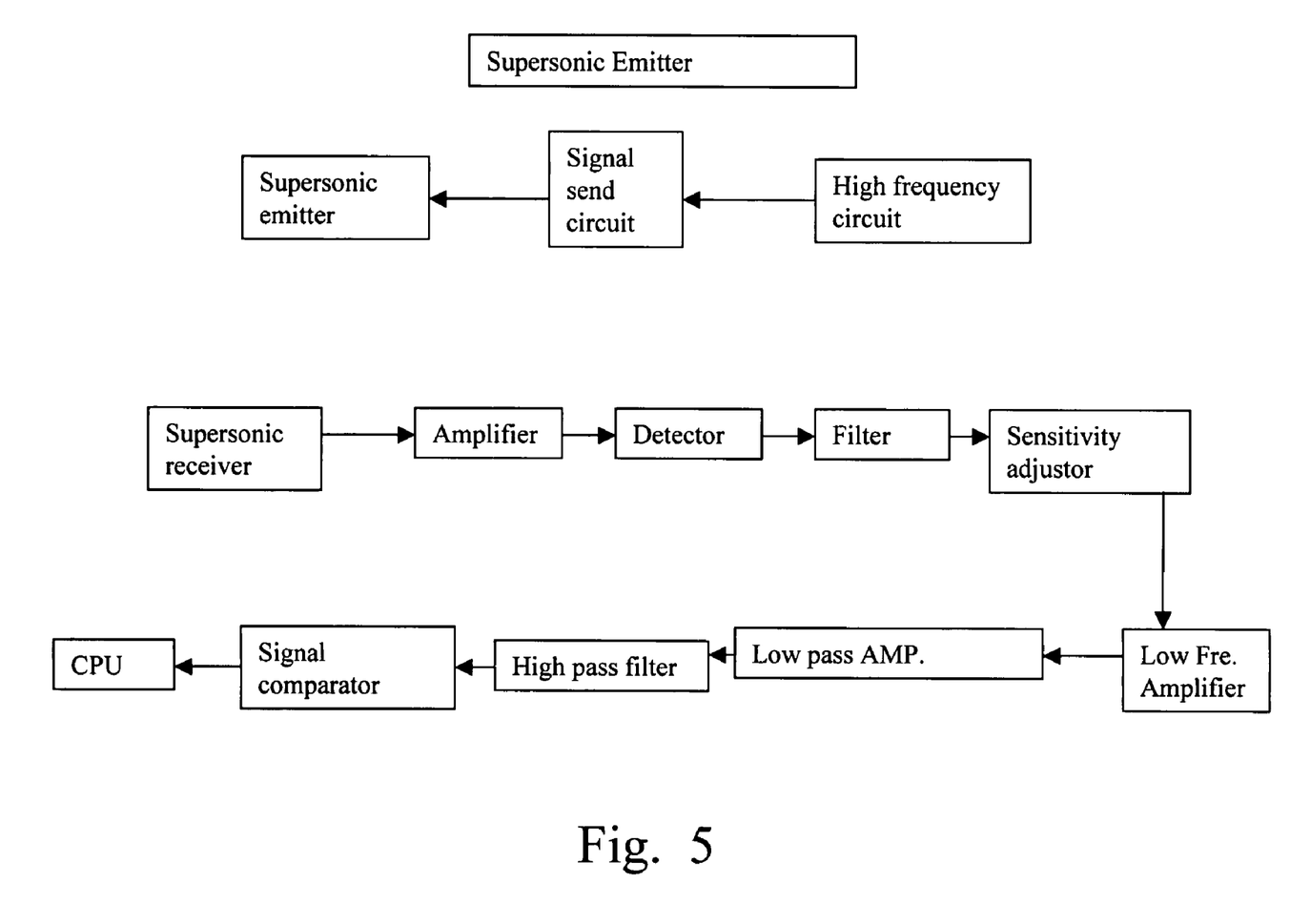
FIG. 5 is a functional block diagram about the supersonic wave detecting unit of the present invention.

A supersonic detecting unit serves to detecting the movement of objects within the car by emitting supersonic waves and then receiving reflecting supersonic waves and then analyzing the result which is then transferred to the CPU.

Referring to FIG. 5, the supersonic wave detecting unit includes a supersonic wave emitter and a supersonic wave receiver. The supersonic wave emitter has a high frequency circuit, a signal pushing circuit, and a supersonic wave emitting unit. The supersonic wave receiver has a supersonic wave receiving unit, an amplifier, a detecting circuit, a filter, a sensitivity adjust circuit, a low frequency amplifier, a low pass amplifier, a high pass amplifier, and a signal comparator.

In operation, in the supersonic wave emitter, the high frequency oscillator generates a specific frequency supersonic wave, for example, 40 kHz. The signal is outputted through the signal pushing circuit and a resister is used to confine the power. Then the supersonic wave emitter is used to emit supersonic wave to an interior of a car.

In the supersonic wave receiver, the supersonic wave receiving unit receives reflected supersonic waves which is amplified and then the processed by the detector and filter. Then a low frequency amplifier serves to amplify the signal.

Figure 6:
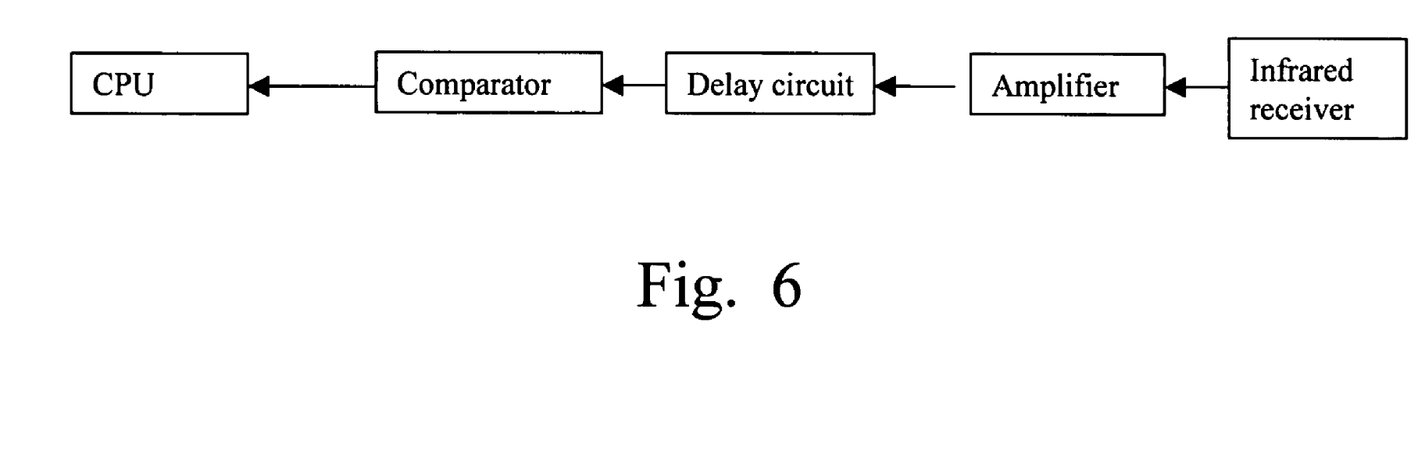
FIG. 6 shows the function block diagram about the ingrared receiving unit of the present invention.

Referring to FIG. 6, an infrared receiver has an infrared receiving diode for receiving infrared signals from the portable alarm device, an amplifier for amplifying the signals from the infrared receiver, a signal comparator, and a signal delay and band-broadening circuit. Finally, the signals are transferred to CPU.

Figure 7:
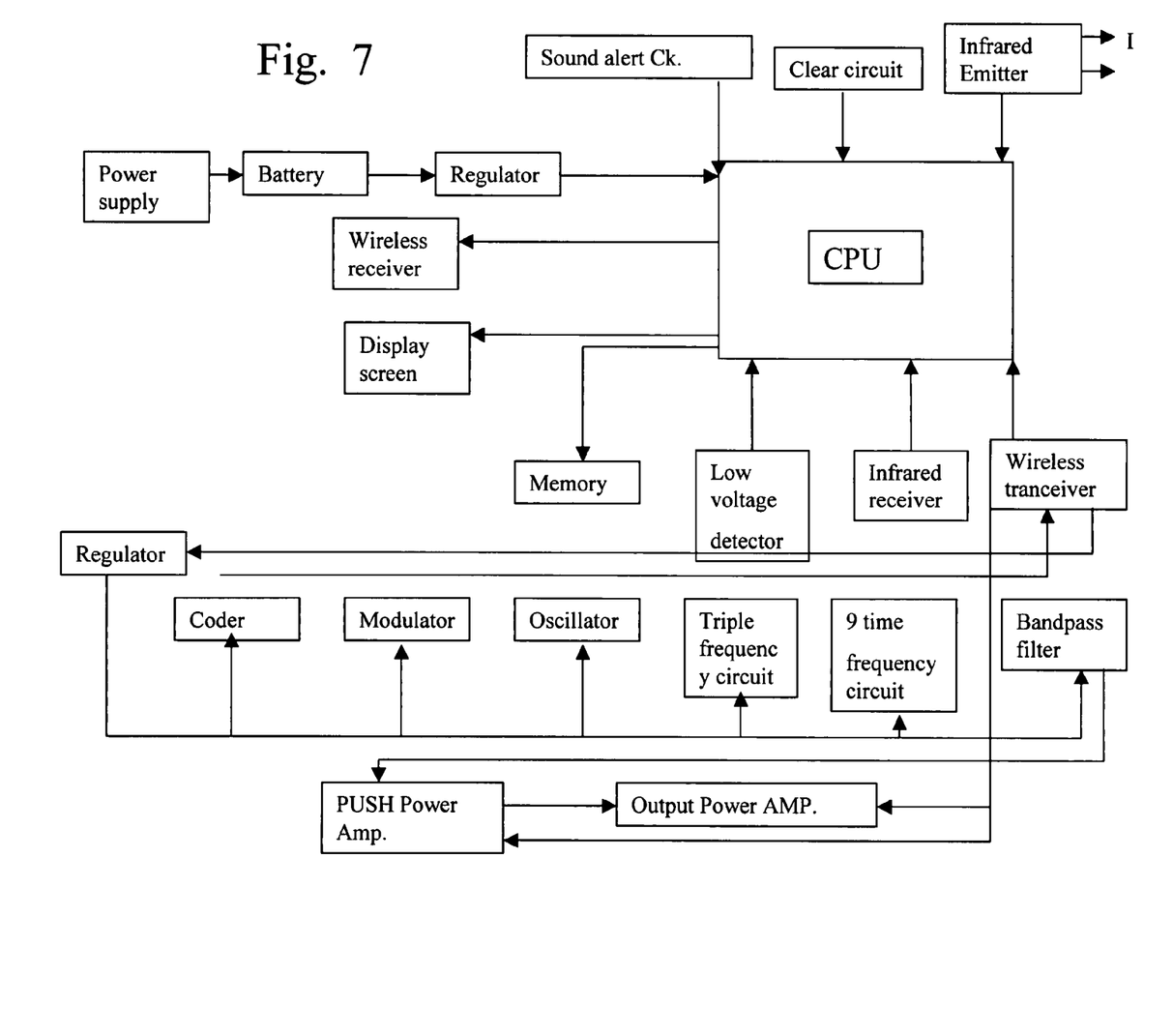
FIG. 7 shows the functional block diagram about the portable alarm device of the present invention.

FIG. 7 shows the portable alarm device. The portable alarm device has a power supply having a battery set. The battery set is installed with a charging circuit for being connected to an external power supply. The power is supplied through a regulator and then is transferred to the CPU. The CPU is a programmer processor for decoding, power on and off, alarming, accessing alarms, clearing alarm, emitting alarm about power deficiency, power saving control, and time sequence control, etc. The CPU has an oscillating circuit. The low voltage detecting circuit has a low voltage IC (for example, N TAP). When voltage is low, a trigger signal is transferred to the CPU, and then a buzzer will emit sounds. An LCD display is controlled by the CPU so as to display the alarm on the LCD display. An accessing memory and a clearing circuit are operated with the CPU. When power is off, the power saving circuit will cause the portable alarm device to be in a power saving power. Only the CPU operates and the display is closed for saving power. An infrared signal emitting unit serves to emit infrared signals to the burglar-proof alarm circuit for actuating the burglar-proof alarm circuit and checking the affectivity of input codes. Or the burglar-proof alarm circuit is remote-controlled to a delay alarm process. Besides the portable alarm device includes a the high frequency amplifier, band pass filter, local oscillating circuit, and the mixing circuit. The local oscillator circuit has a baseband oscillating circuit, a nine-time amplifier circuit, a nine-time frequency modulating circuit for generating an oscillating frequency signal to the mixing circuit for mixing two kinds of signals to have a middle frequency signal. The middle frequency signal is transferred through the middle frequency filter to the second middle frequency IC for filtering, detecting, amplifying and comparing the input signals. Then the signals are input to the CPU.

The process of the present invention is illustrated in the following Initially, the burglar-proof alarm circuit is turned off. The portable alarm device is in a power saving mode. No LCD is displayed. Then the lock is turned on, the burglar-proof alarm circuit is actuated so as to emit a long alert sound and a low voltage detection is performed. An initiation signal is emitted by the wireless wave emitter. The portable alarm device will receive a turn-on code and thus the device is turned on. In above process, if the voltage detection of the burglar-proof alarm circuit is voltage-low, three weak sounds will emit with the transmission of the signals by the wireless wave emitter. When this signal is received by the portable alarm device. It is actuated and displays that the power of the burglar-proof alarm circuit is insufficient.

Nest, the burglar-proof alarm circuit performs a 30 seconds delay process so that the user has sufficient time to leave the car and close the door. Meanwhile, in the 30 second delaying time period, the burglar-proof alarm circuit and the portable alarm device transfer secret codes bidirectionally so as to match the secret codes. There are over 1 millions sets of secret codes which are recorded on the program IC. The coupling of the secret codes is performed through the infrared signal emitter and infrared signal receiver.

Then, the burglar-proof alarm circuit enters into a burglar-proof state. After 10 minutes, a test to determine the signal receiving effect of the portable alarm device is performed. If the test is passed, a short sound is emitted and the LCD displays the system to be in a connecting state.

In the burglar-proof state, when the detecting unit of the burglar-proof alarm circuit is triggered, a flash is emitted through 10 seconds and an alarm is emitted. Meanwhile, the wireless wave emitter outputs RF alarm signals and the portable alarm device receives RF alarm signals so as to enter into the burglar-proof operation state and the LCD display displays abnormal signals.

After the burglar-proof alarm circuit performs the burglar-proof operation, if it is not turn-off by a key or the setting is not be released, it will enter into the burglar-proof alert state after a set alert operation time is elapsed. If the system is turned off by a key. The power of the burglar-proof alarm circuit will be closed. Meanwhile, since the wireless wave emitting unit emits a turn-off signal, after the portable alarm device receives the turn-off codes, it will enter into a power saving mode.

Besides when the user desires to release the burglar-proof alarm device, the user can remotely controls the process that the burglar-proof alarm circuit enters into the delay of the alarm process so as to prevent from actuating the burglar-proof alarm system by mistake. The burglar-proof alarm circuit is in a state burglar-proof state. The infrared signal emitting unit of the portable alarm device is aimed to the infrared signal receiving unit of the burglar-proof alarm circuit. A function key is pressed to emit a delay code. When the burglar-proof alarm circuit receives the delay code and assures that the code is a correct one. A waiting time is started, for example 20 seconds. Meanwhile, the wireless wave emitting unit of the burglar-proof alarm circuit will output a small power delay assure signal. When the portable alarm device receives the delay assure signal, four sounds are emitted as an assure indication. When within the waiting time burglar-proof alarm circuit. A function key is pressed to emit a delay code. When the burglar-proof alarm circuit receives the delay code and assures that the code is a correct one. A waiting time is started, for example 20 seconds. Meanwhile, the wireless wave emitting unit of the burglar-proof alarm circuit will output a small power delay assure signal. When the portable alarm device receives the delay assure signal, four sounds are emitted as an assure indication. When within the waiting time period, the burglar-proof detection is not actuated, after the waiting time is elapsed, the burglar-proof alarm circuit returns to the burglar-proof alert state with a preset delay time period of 30 seconds. The user must release the setting of the burglar-proof alarm circuit within the preset time period, otherwise after the time is elapsed, the burglar-proof alarm circuit will trigger the burglar-proof alarm operation.

What is claimed is:

1. A vehicle steering wheel lock with a burglar-proof alarm device comprising:

a burglar-proof alarm circuit for emit a great sound or a strong flash as an abnormal signal is triggered and a wireless signal is emitted; the burglar-proof alarm circuit having a battery set as a power supply, power from the power supply passing through a switch circuit, a retaining circuit and a regulating circuit to a central processing unit (CPU) which is a programmable operation processor; an oscillating circuit being in the CPU; a sound emitting circuit for emitting sounds as receiving alarms from the CPU; a low pressure detecting circuit including a lower voltage IC for informing PCU when voltage is low; an indicator is flashed in the opening state under the control of the CPU for showing that the burglar-proof alarm circuit is normally operated; the burglar-proof alarm circuit further has an air pressure detecting unit, a supersonic receiving unit and a wireless signal emitting unit;

the wireless signal detecting unit having a regulator circuit, a coding circuit, a modulation circuit, a baseband oscillating circuit, a triple frequency circuit, a nine-time frequency circuit, a pass band filter, a first stage power supply, and an output power amplifier; the regulating circuit serving to stable the input voltage; the coding circuit serving to generate coding signals; the modulating circuit serves to modulate the frequency of the signals; signals being processed by the triple frequency circuit, and the nine-time frequency circuit and then being transferred to the pass band filter and then to the first stage power supply, and the output power amplifier for amplifying the signals to be emitted out;

the air pressure detecting unit serving to detect the air pressure within a car so as to detect whether the door of a car is opened by using a positive pressure and negative pressure; the air pressure detecting unit including a power filter, a regulating circuit, an air pressure sensor, a low pass amplifier, a positive and a negative wave comparator, and a sensitivity adjusting circuit; signals pass through the air pressure detecting unit includes a power filter, a regulating circuit, an air pressure sensor, a low pass amplifier, and then entering into the positive wave comparator, and the negative comparator circuit so as to determine the variation of the air pressure within the car; then the variation is changed as electronic signals are in the CPU; the CPU performing preset burglar-proof alarm actions; the sensitivity adjusting circuit being formed by mainly a variator;

a supersonic detecting unit for detecting movements of objects within the car by emitting supersonic waves and then receiving reflecting supersonic waves and then analyzing the result which is then transferred to the CPU; the supersonic wave detecting unit includes a supersonic wave emitter and a supersonic wave receiver; the supersonic wave emitter having a high frequency circuit, a signal pushing circuit, and a supersonic wave emitting unit; the supersonic wave receiver having a supersonic wave receiving unit, an amplifier, a detecting circuit, a filter, a sensitivity adjust circuit, a low frequency amplifier, a low pass amplifier, a high pass amplifier, and a signal comparator;

an infrared receiver having an infrared receiving diode for receiving infrared signals from the portable alarm device, an amplifier for amplifying the signals from the infrared receiver, a signal comparator, and a signal delay and band-broadening circuit, the signals are transferred to CPU; the portable alarm device having an power supply which is a battery set; the battery set being installed with a charging circuit for being connected to an external power supply; power being supplied through a regulator and then being transferred to the CPU; the CPU being a programmer processor for decoding, power on and off, alarming, accessing alarms, clearing alarms, emitting alarms about power deficiency, power saving control, and time sequence control; the CPU having an oscillating circuit; the low voltage detecting circuit having a low voltage IC; an LCD display being controlled by the CPU so as to display the alarm on the LCD display; an accessing memory and a clearing circuit being operated with the CPU; when power is off, the power saving circuit will cause the portable alarm device to be in a power saving power; only the CPU operating and the display being closed for saving power; an infrared signal emitting unit for emitting infrared signals to the burglar-proof alarm circuit for actuating the burglar-proof alarm circuit and checking the affectivity of input codes; or the burglar-proof alarm circuit being remote-controlled to a delay alarm process; the portable alarm device including a wireless wave receiving unit;

the wireless wave emitting unit including a receiving antennal circuit, a high frequency amplifier, a band pass filter, a local oscillating circuit, a mixing circuit, a middle frequency circuit, and a second middle frequency IC; the receiving antenna circuit being for adjusting the harmonic receiving frequency for receiving high frequency signal, which is then passed through the high frequency amplifier, band pass filter, local oscillating circuit, and the mixing circuit; the local oscillator circuit having a baseband oscillating circuit, a nine-time amplifier circuit, a nine-time frequency modulating circuit for generating an oscillating frequency signal to the mixing circuit for mixing two kinds of signals to have a middle frequency signal; the middle frequency signal being transferred through the middle frequency filter to the second middle frequency IC for filtering, detecting, amplifying and comparing the input signals; and then the signals being inputted to the CPU.

2. The wire winding device with smooth outlets as claimed in claim 1, wherein the air pressure detecting unit further comprise a sensitivity adjust circuit mainly made of variator.

3. The wire winding device with smooth outlets as claimed in claim 1, wherein the air pressure detecting unit is a condenser microphone.

4. The wire winding device with smooth outlets as claimed in claim 1, wherein the supersonic wave receiver comprise a sensitivity adjust circuit mainly made of variator.

* * * * *